United States Patent
Liu et al.

(10) Patent No.: US 9,055,438 B2
(45) Date of Patent: Jun. 9, 2015

(54) EXCHANGING DATA BASED UPON DEVICE PROXIMITY AND CREDENTIALS

(75) Inventors: Eric Liu, Santa Clara, CA (US); Manjimath Chatterjee, Sunnyvale, CA (US); Robert A Boeller, Poway, CA (US); Dustin C Rosing, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 13/194,419

(22) Filed: Jul. 29, 2011

(65) Prior Publication Data
US 2013/0029597 A1    Jan. 31, 2013

(51) Int. Cl.
| | |
|---|---|
| H04W 12/02 | (2009.01) |
| H04W 12/04 | (2009.01) |
| H04W 12/06 | (2009.01) |
| H04B 5/00 | (2006.01) |
| H04W 84/12 | (2009.01) |
| H04W 84/18 | (2009.01) |
| H04W 92/18 | (2009.01) |
| H04L 29/06 | (2006.01) |

(52) U.S. Cl.
CPC ............ *H04W 12/06* (2013.01); *H04B 5/0081* (2013.01); *H04W 84/12* (2013.01); *H04W 84/18* (2013.01); *H04W 92/18* (2013.01); *H04L 63/0492* (2013.01)

(58) Field of Classification Search
USPC ............... 455/41.1–41.3, 456.1, 518, 550.1, 455/552.1, 554.2, 556.1, 560; 713/155, 713/300; 726/19, 17; 370/328–329, 370/252–254, 401; 705/66, 35, 67, 44, 71
See application file for complete search history.

(56) References Cited

U.S. PATENT DOCUMENTS

| | | | |
|---|---|---|---|
| 7,657,255 B2 | 2/2010 | Abel et al. | |
| 8,385,822 B2 | 2/2013 | Chatterjee | |
| 2002/0013831 A1* | 1/2002 | Astala et al. | 709/220 |
| 2003/0228842 A1* | 12/2003 | Heinonen et al. | 455/41.2 |
| 2005/0021940 A1* | 1/2005 | Ma | 713/155 |
| 2005/0266798 A1* | 12/2005 | Moloney et al. | 455/41.2 |
| 2006/0068785 A1* | 3/2006 | Kamijo et al. | 455/435.1 |
| 2006/0126531 A1* | 6/2006 | Myojo et al. | 370/252 |
| 2006/0143705 A1* | 6/2006 | Sentoff | 726/19 |
| 2007/0124809 A1* | 5/2007 | Narin et al. | 726/6 |
| 2007/0234432 A1* | 10/2007 | Korkishko et al. | 726/27 |
| 2008/0117117 A1* | 5/2008 | Washiro | 343/850 |
| 2008/0151847 A1 | 6/2008 | Abujbara | |
| 2009/0094681 A1 | 4/2009 | Sadler et al. | |
| 2009/0111378 A1* | 4/2009 | Sheynman et al. | 455/41.1 |
| 2009/0198618 A1* | 8/2009 | Chan et al. | 705/66 |

(Continued)

OTHER PUBLICATIONS iPhone 5 Will Enable Ambitious Remote Computing Program—Source [Exclusive]; http://www.cultofmac.com/iphone-5-will-enable-ambitious-remote-computing/66825; Kahney, L.; Nov. 1, 2010.

(Continued)

*Primary Examiner* — Andrew Wendell
*Assistant Examiner* — Cindy Trandai
(74) *Attorney, Agent, or Firm* — Norton Rose Fulbright US LLP (57) ABSTRACT

Illustrated is a system and method to transmit a credential to a proximate first device, the first device validating the credential. The system and method also includes transmitting data to the first device. The system and method also includes transmitting the credential to a proximate second device, the second device validating the credential and to receive the data from the first device.

24 Claims, 11 Drawing Sheets

(56) References Cited

U.S. PATENT DOCUMENTS

| | | |
|---|---|---|
| 2010/0043056 A1* | 2/2010 | Ganapathy ................ 726/2 |
| 2010/0082784 A1 | 4/2010 | Rosenblatt et al. |
| 2010/0083012 A1* | 4/2010 | Corbridge et al. ........... 713/300 |
| 2010/0180063 A1 | 7/2010 | Ananny et al. |
| 2010/0218249 A1 | 8/2010 | Wilson et al. |
| 2010/0272030 A1* | 10/2010 | Babbar ................ 370/329 |
| 2010/0290390 A1* | 11/2010 | Souissi et al. ............... 370/328 |
| 2011/0047609 A1 | 2/2011 | Tetsuhashi |
| 2011/0076948 A1* | 3/2011 | Jabara et al. ................ 455/41.2 |
| 2011/0294502 A1* | 12/2011 | Oerton ................ 455/426.1 |
| 2011/0314530 A1* | 12/2011 | Donaldson ................ 726/7 |

OTHER PUBLICATIONS

Remote Computing in Iphone, NFC and Mac App Store; http://weeble.net/nfc-equipped-iphone/2622/ ; Chezz; Mar. 18, 2011.

iPhone 5 Will Enable Ambitious Remote Computing Program—Source [Exclusive]; http://www.cultofmac.com/iphone-5-will-enable-ambitious-remote-computing/66825; Kahney. L.: Nov. 1, 2010.

Remote Computing in Iphone, NFC and Mac App Store; http://weeble.net/nfc-equipped-iphone/2622/; CHEZZ; Mar. 18, 2011.

* cited by examiner

EXCHANGING DATA BASED UPON DEVICE PROXIMITY AND CREDENTIALS

CROSS REFERENCE TO RELATED APPLICATIONS

This application is related to U.S. patent application Ser. No. 12/478,766, filed Jun. 4, 2009, entitled INDUCTIVE SIGNAL TRANSFER SYSTEM FOR COMPUTING DEVICES; which is a continuation-in-part of U.S. patent application Ser. No. 12/239,656, filed Sep. 26, 2808, entitled ORIENTATION AND PRESENCE DETECTION FOR USE IN CONFIGURING OPERATIONS OF COMPUTING DEVICES IN DOCKED ENVIRONMENTS, which claims benefit of priority to the following applications: Provisional U.S. Patent Application No. 61/142,560, filed Jan. 5, 2009, entitled ELECTRICAL APPARATUS FOR REAL TIME WIRELESS POWER DELIVERY; Provisional U.S. Patent Application No. 61/142,194, filed Dec. 31, 2808, entitled PROTOCOL FOR REAL TIME POWER AND ACCESSORY DATA CONNECTION; Provisional U.S. Patent Application No. 61/142,195, filed Jan. 1, 2009, entitled TECHNIQUES FOR MAGNETICALLY COUPLING CHARGING CIRCUITS AND DEVICES; Provisional U.S. Patent Application No. 61/142,602, filed Jan. 5, 2009, entitled MAGNETIC CLASP WITH MULTIPLE ORIENTATIONS AND ORIENTATION DETECTION; all of the aforementioned priority applications being hereby incorporated by reference in their entirety.

BACKGROUND

Authentication can be implemented via a variety of methods including those that utilize the following: symmetric keys, asymmetric keys, hashing, or a check sum value. Authentication can be used to identify a user, a device, to facilitate payment, or for a variety of other purposes. Some example technologies that are used in conjunction with an authentication regime are: Radio-frequency identification (RFID), BLUETOOTH™, and 802.11(a-n) (collectively known as "WiFi"). An authentication regime, as implemented by these technologies, includes the providing of one of the aforementioned keys from a first device to second device, the second device authenticating the first device based upon the providing of the correct key.

BRIEF DESCRIPTION OF THE DRAWINGS

Some embodiments of the invention are described, by way of example, with respect to the following figures.

DETAILED DESCRIPTION

Illustrated is a system and method to authenticate a device, used to transfer and receive data, to an additional device, where authentication takes the form of placing the device in proximity to the additional device. Both the device and additional device may be part of a network, and at least one of the devices may include a coil and be capable of inductive charging and data transfer via a power channel and an inductive link. Inductive charging between proximate devices, where an inductive link exists between these devices, is described in U.S. patent application Ser. No. 12/621,087 filed on Nov. 19, 2009 and titled "PORTABLE POWER SUPPLY DEVICE FOR MOBILE COMPUTING DEVICES" and U.S. patent application Ser. No. 12/478,766, filed Jun. 4, 2009, entitled INDUCTIVE SIGNAL TRANSFER SYSTEM FOR COMPUTING DEVICES, both of which are incorporated by reference in their entirety. The device may be a mobile computing device as outlined below. Proximate may be within a range of 0-4 cm. Further, the authentication may take place over a low-range-transport medium that includes: the inductive link, RFID, BLUETOOTH™, or some other suitable transport medium.

In some example embodiments, a mobile computing device is proximate to an additional device such that the mobile computing device is authenticated to the additional device ("A"). This mobile computing device may be brought proximate to a further device ("B") such that the mobile computing device is authenticated to "B". The mobile computing device is able to transmit and receive data between "A" and "B", based upon its being authenticated to both "A" and "B". The data may be transported over some transport medium including: WiFi, System of Mobile (GSM) communication system, a Code Division Multiple Access (CDMA system), a Universal Mobile Telecommunications System (UNITS), OF some other suitable transport medium.

In some example embodiments, the authentication of the mobile computing device to "A" and "B" may cease where the mobile computing device is no longer proximate to "A" or "B". For example, if the mobile computing device is removed from proximity to "A", then the mobile computing, device may no longer be authenticated to "A", Similarly, if the mobile computing device is no longer within range of the "A" to use one of the above referenced transport mediums, the mobile computing device may no longer be authenticated to "A". The use of the range of the mobile computing device to "A" as a basis for continuing authentication may be referred to herein as non-persistent authentication. In some cases, a mobile computing device may have persistent authentication wherein once the mobile computing device is authenticated to "A", it continues to be authenticated irrespective of its proximity or range to "A".

Figures 1, 1A:
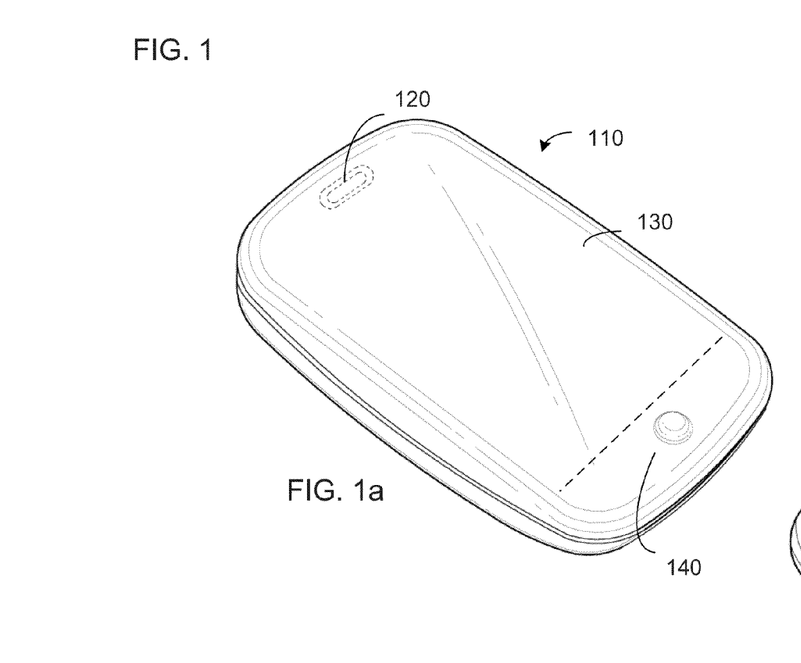
FIG. 1a illustrates one embodiment of a mobile computing device that is authenticated to an additional device, where authentication takes the form of placing the device in proximity to the additional device.
Figure 1B:
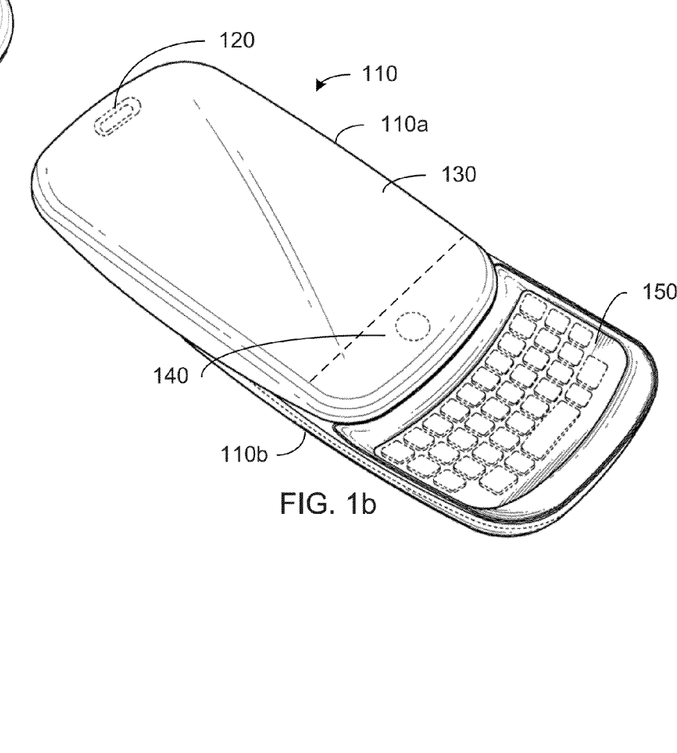
FIG. 1b illustrates one embodiment of a mobile computing device that is authenticated to an additional device, where authentication takes the form of placing the device in proximity to the additional device.

FIG. 1a and 1b illustrate one embodiment of a mobile computing device 110 that is authenticated to an additional device, where authentication takes the form of placing the device in proximity to the additional device. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, slate device, smartphone, netbook, or laptop computer. The mobile computing device 110 is configured to host and execute a phone application for placing and receiving telephone calls. In one example embodiment, the configuration as disclosed may be configured for use between a mobile computing device, that may be host device, and an accessory device.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with Public Switched Telephone Networks (PSTN) and/or data networks having Voice over Internet Protocol (VoIP) functionality. Likewise, the mobile computing device 110 is only by way of example, and the principles of its functionality apply to other computing devices, e.g., desktop computers, slate devices, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a Personal Digital Assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. In one embodiment the screen may be 1.5 inches to 5.5 inches (or 4 centimeters to 14 centimeters) diagonally. The touch sensitive screen may be a transfective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an Active-matrix OLED (AMOLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad. (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACT FLASH, SD CARD, XD CARD, MEMORY STICK, MULTIMEDIA CARD, SDIO, and the like.

Figure 2:
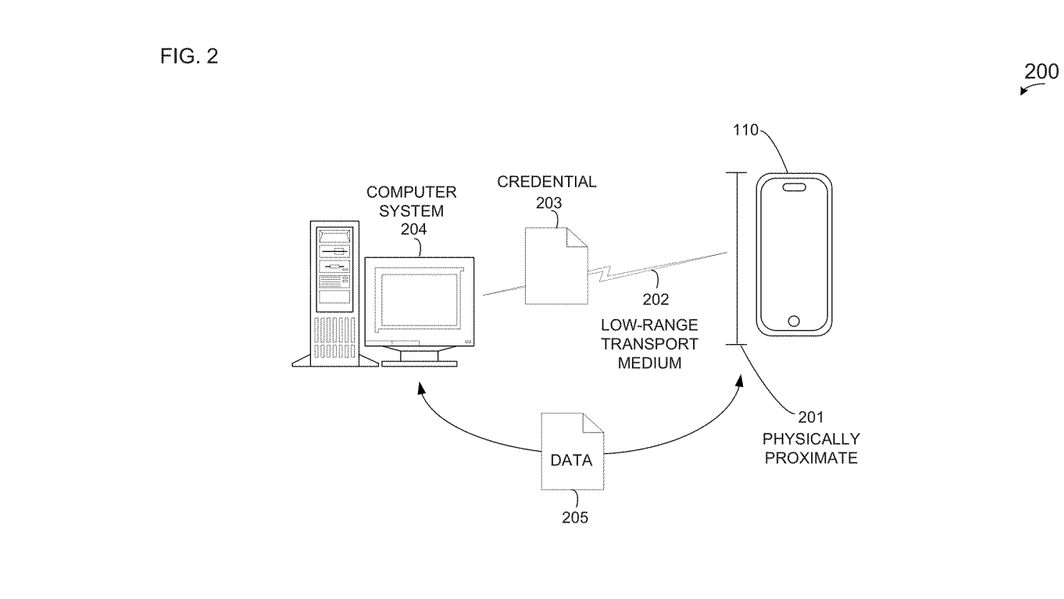
FIG. 2 is a diagram of a system, according to an example embodiment, used to authenticate the mobile computing device to a computer system for the purpose of data transfer.

FIG. 2 is a diagram of a system 200 used to authenticate the mobile computing device 110 to a computer system 204 for the purpose of data transfer. Shown is a mobile computing device 110 that, as denoted at 201, is physically proximate to the computer system 204. Where the mobile computing device 110 is physically proximate to the computer system 204, a credential 203 to transmitted along a low-range transport medium 202 to the computer system 204. The credential 203 may include: a symmetric key, an asymmetric key, a hash value, a digital representation of a finger print, or a value to be used in a check sum calculation. In cases where the mobile computing device 110 is authenticated to the computer system 204, data 205 may be exchanged between the mobile computing device 110 and the computer system 204. As discussed above, the authentication may be persistent or non-persistent.

Figure 3:
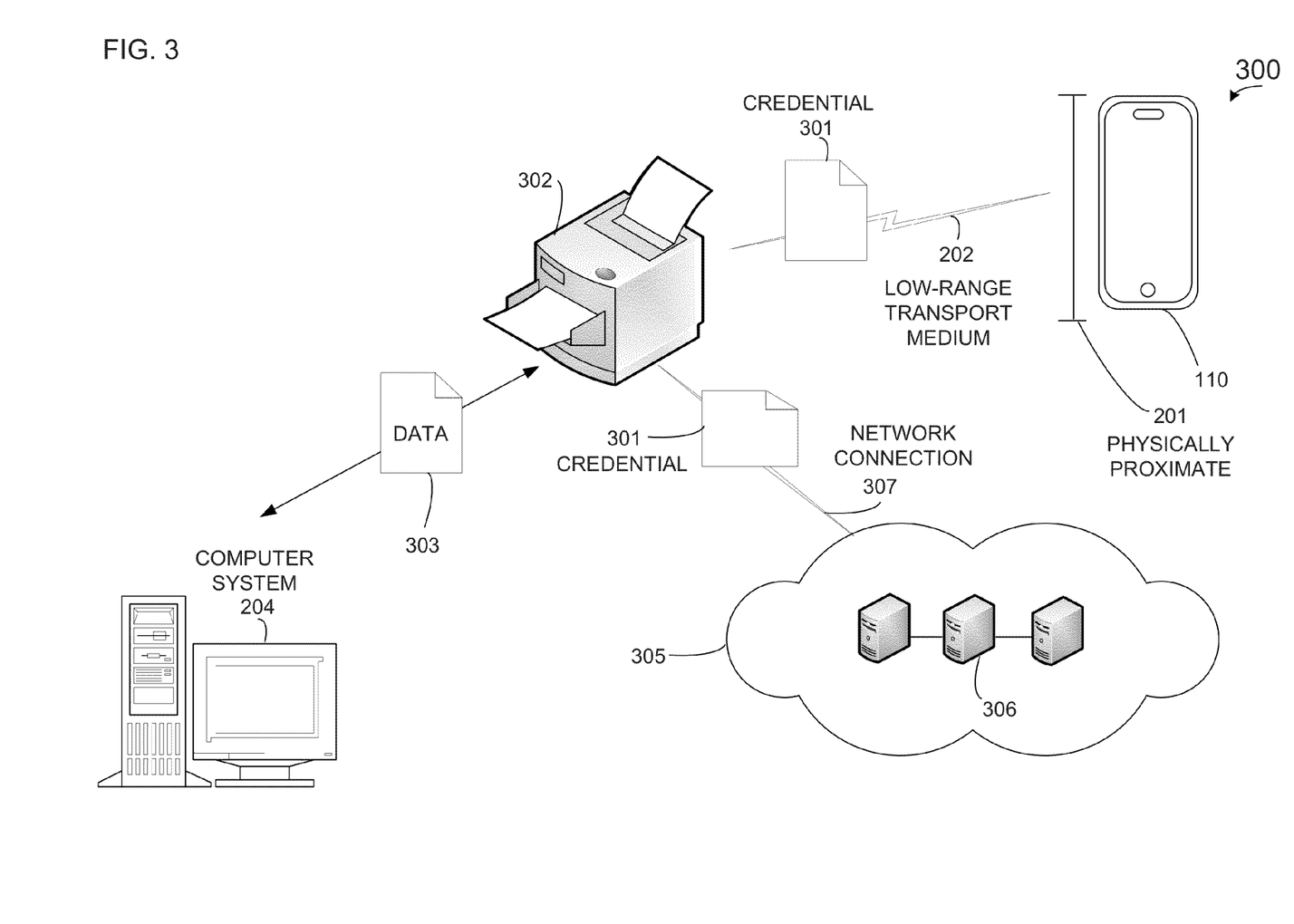
FIG. 3 is a diagram of a system, according to an example embodiment, used to authenticate the mobile computing device to a printer and a network, where the printer, network, and computer system are part of a network.

FIG. 3 is a diagram of a system 300 used to authenticate the mobile computing device to a printer 302 and a network 305, where the printer 302, network 305, and computer system 204 are part of a network. As illustrated, the mobile computing device 110 is authenticated to the printer 302 using a credential 301 transmitted over the low-range transport medium 202. The credential 301 may include: a symmetric key, an asymmetric key, a hash value, or a value to be used in a check sum calculation. Where the credential 301 successfully authenticates the mobile computing device 110 to the printer 302, the credential 301 may be transmitted across the network connection 307 to the network 305 by the printer 302. The network 305 may include a plurality of devices 306 that may exchange data with the printer 302 based upon the authentication of the mobile computing device 110 based upon the credential 301. The plurality of devices 306 may include a web server, application server, and database server, where this combination is used to operate a website. This website may be a social networking website, wherein one or more profiles for the user of the mobile computing device 110 are stored. Example social network websites include: FACEBOOK™, LINKEDIN™, or MYSPACE™. In one example embodiment, data in the form of a profile is transmitted to the printer 302 by the devices that make up the website, where the credential 301 is received an authenticated by one of the plurality of devices 306. In some example embodiments, data 303 is exchanged between the computer system 204 and the printer 302, where the mobile computing device 110 is authenticated to both the computer system 204 and the printer 302.

Figure 4:
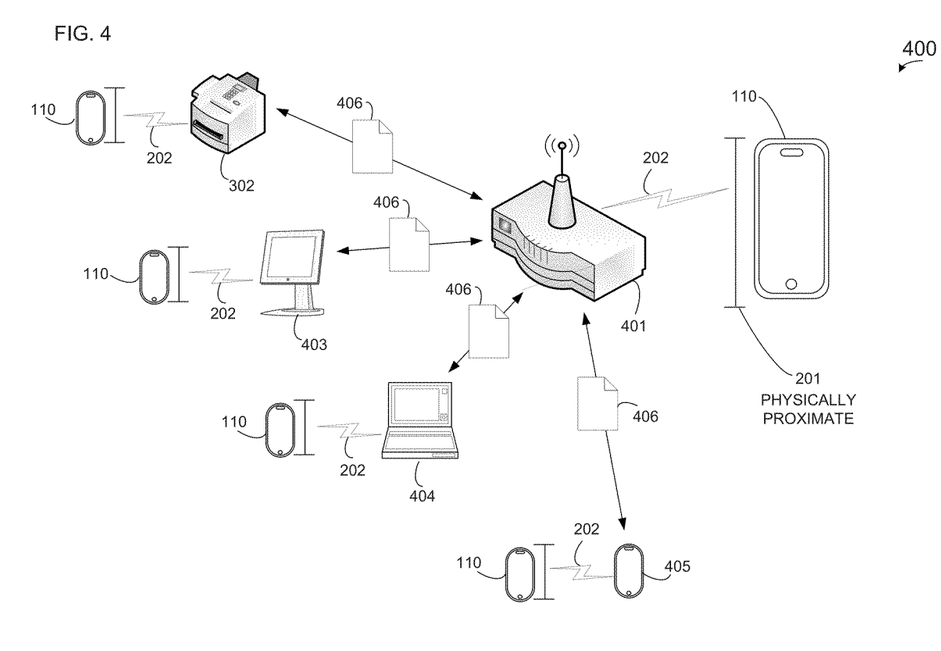
FIG. 4 is a diagram of a system, according to an example embodiment, used to authenticate a mobile computing device to a network, where a plurality of devices communicate using a network device.

FIG. 4 is a diagram of an example system 400 used to authenticate a mobile computing device 110 to a network, where a plurality of devices communicate using a network device. Shown is a network device in the form of a wireless router 401. Some example embodiments, the network device is a wireless access point, switch, or bridge. Using the low-range transport medium 202, the mobile computing device 110 is authenticated to the wireless router 401 via the providing of a credential (not pictured) to the wireless router 401. As shown, this mobile computing device 110 may also be authenticated to a monitor 403, laptop computer 404, and additional mobile computing device 405. Where authentication has occurred, data 406 may be transmitted by one more of the devices (e.g., the monitor 403, the laptop computer 404, of the additional mobile computing device 405) using wireless router 401. For example, the data 406 may be transmitted from the mobile computing device 110 to the monitor 403, and from the monitor 403 to the wireless router 401, where the mobile computing device 110 has been authenticated to both the monitor 403 and the wireless router 401. Instances where the mobile computing device 110 has been authenticated include those where, as depicted, the mobile computing device 110 has been proximate to the monitor 403, laptop computer 404, printer 302, and additional mobile computing device 405.

Figure 5:
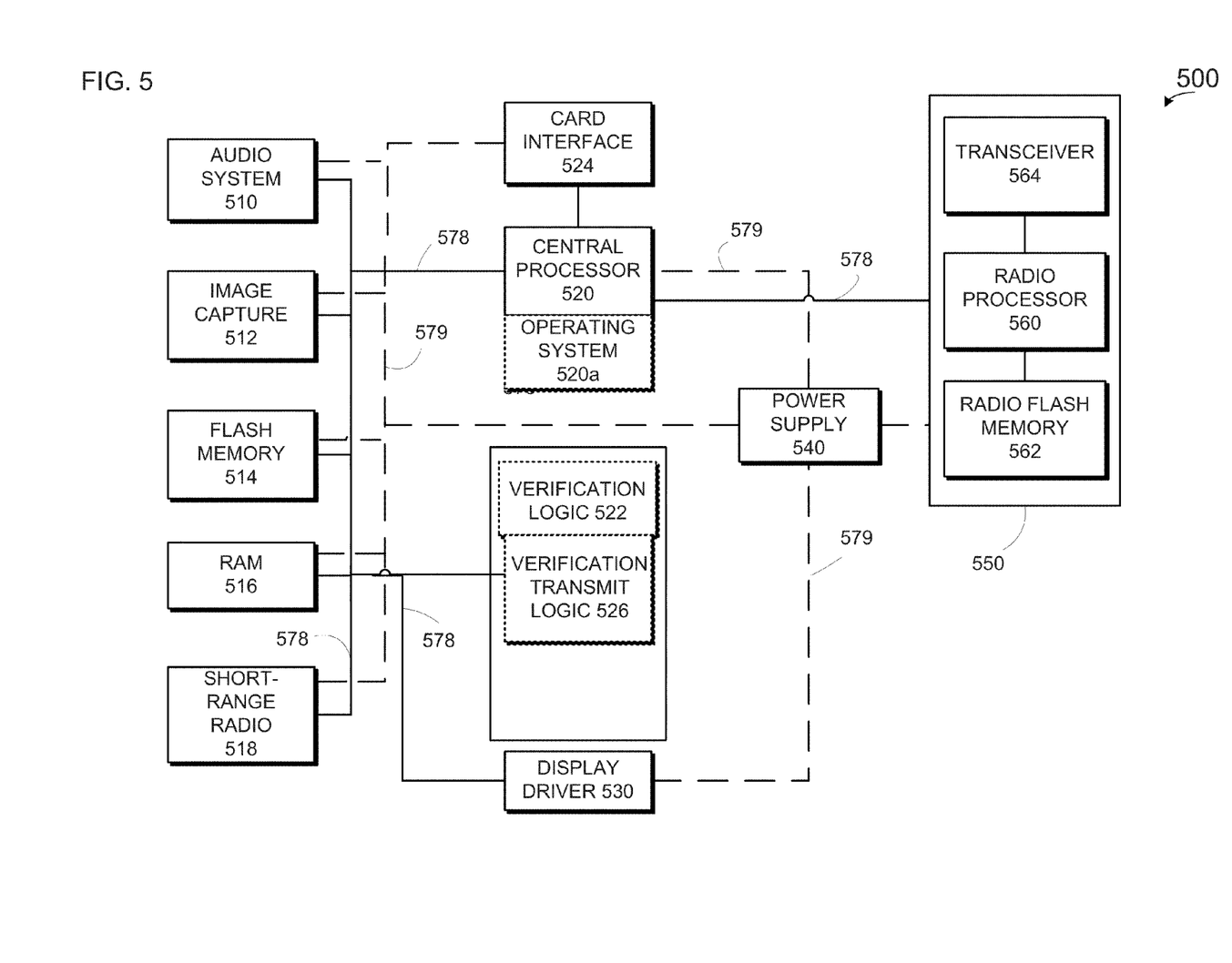
FIG. 5, a block diagram illustrating an architecture, according to an example embodiment, of a mobile computing device enabled to be authenticated to a plurality of devices.

Referring next to FIG. 5, a block diagram illustrates an example architecture of a mobile computing device 110, enabled to be authenticated to a plurality of devices. By way of example, the architecture illustrated in FIG. 5 will be described with respect to the mobile computing device of FIG. 1*a*, 1*b*, 3, 4, or 5. The mobile computing device 110 includes a central processor 520, a power supply 540, and a radio subsystem 550. Examples of a central processor 520 include processing chips and system based on architectures such as ARM (including cores made by microprocessor manufacturers), ARM XSCALE, QUALCOMM SNAPDRAGON, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 520 is configured for operation with a computer operating system 520*a*. The operating system 520*a* is an interface between hardware and an application, with which a user typically interfaces. The operating system 520*a* is responsible for the management and coordination of activities and the sharing of resources of the mobile computing device 110. The operating system 520*a* provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 520 communicates with an audio system 510, an image capture subsystem (e.g., camera, video or scanner) 512, flash memory 514, RAM memory 516, and a short range radio module 518 (e.g., Bluetooth, Wireless Fidelity (WiFi) component (e.g., IEEE 802.11, 802.20, 802.15, 802.16)). The central processor 520 communicatively couples these various components or modules through a data line (or bus) 578. The power supply 540 powers the central processor 520, the radio subsystem 550 and a display driver 530 (which may be contact- or inductive-sensitive). The power supply 540 may correspond to a direct current source (e.g., a battery pack, including rechargeable) or an alternating current (AC) source. The power supply 540 powers the various components through a power line (or bus) 579. The power supply 540 may include at least one coil to facilitate inductive charging and data transfer.

The central processor communicates with applications executing within the mobile computing device 110 through the operating system 520*a*. In addition, intermediary components, for example, a verification logic module 522 and a verification transmit logic module 526, provide additional communication channels between the central processor 520 and operating system 520 and system components, for example, the display driver 530.

It is noted that in one embodiment, central processor 520 executes logic (e.g., by way of programming, code, or instructions) corresponding to executing applications interfaced through, for example, the navigation area 140 or switches. It is noted that numerous other components and variations are possible to the hardware architecture of the computing device 500, thus an embodiment such as shown by FIG. 5 is just illustrative of one implementation for an embodiment.

The radio subsystem 550 includes a radio processor 560, a radio memory 562, and a transceiver 564. The transceiver 564 may be two separate components for transmitting and receiving signals or a single component for both transmitting and receiving signals. In either instance, it is referenced as a transceiver 564. The receiver portion of the transceiver 564 communicatively couples with a radio signal input of the device 110, e.g., an antenna, where communication signals are received from an established call (e.g., a connected or on-going call). The received communication signals include voice (or other sound signals) received from the call and processed by the radio processor 560 for output through the speaker 120. The transmitter portion of the transceiver 564 communicatively couples a radio signal output of the device 110, e.g., the antenna, where communication signals are transmitted to an established (e.g., a connected (or coupled) or active) call. The communication signals for transmission include voice, e.g., received through the microphone of the device 110, (or other sound signals) that is processed by the radio processor 560 for transmission through the transmitter of the transceiver 564 to the established call.

In one embodiment, communications using the described radio communications may be over a voice or data network. Examples of voice networks include GSM communication system, a CDMA system, and UMTS. Examples of data networks include General Packet Radio Service (GPRS), third-generation (3G) mobile (or greater), High Speed Download Packet Access (FISDPA), High Speed Uplink Packet Access (HSUPA), and Worldwide Interoperability for Microwave Access (WiMAX).

White other components may be provided with the radio subsystem 550, the basic components shown provide the ability for the mobile computing device to perform radio-frequency communications, including telephonic communications. In an embodiment, many, if not all, of the components under the control of the central processor 520 are not required by the radio subsystem 550 when a telephone call is established, e.g., connected or ongoing. The radio processor 560 may communicate with central processor 520 using the data line (or bus) 578.

The card interface 524 is adapted to communicate, wirelessly or wired, with external accessories (or peripherals), for example, media cards inserted into the expansion slot (not shown). The card interface 524 transmits data and/or instructions between the central processor and an accessory, e.g., an expansion card or media card, coupled within the expansion slot. The card interface 524 also transmits control signals from the central processor 520 to the expansion slot to configure the accessory. It is noted that the card interface 524 is described with respect to an expansion card or media card; it also may be structurally configured to couple with other types of external devices for the device 110, for example, an inductive charging station for the power supply 540 or a printing device.

Figure 6:
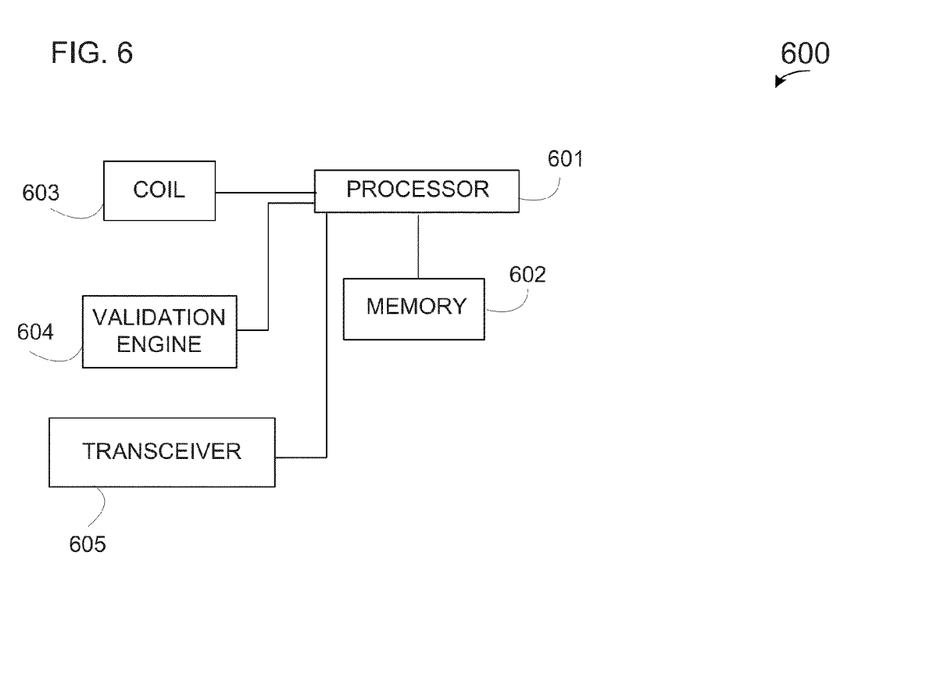
FIG. 6 is a block diagram of a system, according to an example embodiment, representing a network device used to transfer and receive data, to an additional device, where authentication takes the form of placing a mobile computing device in proxim to the network device.

FIG. 6 is a block diagram of an example system 600 representing a network device used to transfer and receive data, to an additional device, where authentication takes the form of placing a mobile computing device in proximity to the network device. The various blocks shown herein may be implemented in software, hardware, or firmware. These blocks may be operatively connected, where operatively connected includes a physical or logical connection. Shown is a processor 601 operatively connected to a memory 602. Operatively coupled to the processor 601 is a coil 603 to establish an inductive link between a mobile computing device and the network device. Operatively coupled to the processor 601 is a validation engine 604 to validate a credential received via the inductive link. Operatively coupled to the processor 601 is a transceiver 605 to transmit data where the credential is validated. In some example embodiments, the network device includes at least one of a router, a wireless access point, a switch, or a bridge. In some example embodiments, the transceiver 605 receives the data from a first device and transmits the data to a second device. In some example embodiments, the first and second devices are connected via a network. In some example embodiments, the coil 603 is used to provide power and the data to a proximate device.

Figure 7:
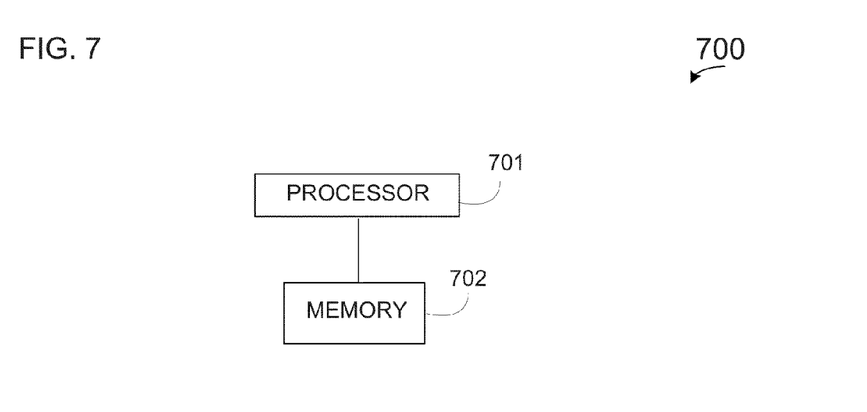
FIG. 7 is a block diagram of a system, according to an example embodiment, representing a mobile computing device used to transfer and receive data to an additional device, where authentication takes the form of placing the device in proximity to the additional device.

FIG. 7 is a block diagram of an example system 700 representing a mobile computing device used to transfer and receive data to an additional device, where authentication takes the form of placing the device in proximity to the additional device. The various blocks shown herein may be implemented in software, hardware, or firmware. These blocks may be operatively connected, where operatively connected includes a physical or logical connection. Shown is a processor 701 operatively connected to a memory 702. The memory 702 is in communication with the central processor 701, the memory 702 including logic encoded in one or more tangible media for execution and when executed operable to transmit a credential to a proximate first device, the first device validating the credential. The logic may also be executed to transmit data to the first device. Additionally, the logic may be executed to transmit the credential to a proximate second device, the second device validating the credential and to receive the data from the first device. In some example embodiments, the credential is used to subsequently access a user profile. In some example embodiments, proximate includes a range of 0 to 4 centimeters. In some example embodiments, the credential includes at least one of a private key, a public key, a hash value, a digital representation of a finger print, or a check sum value. In some example embodiments, the first and second devices are part of the same local area network.

Figure 8:
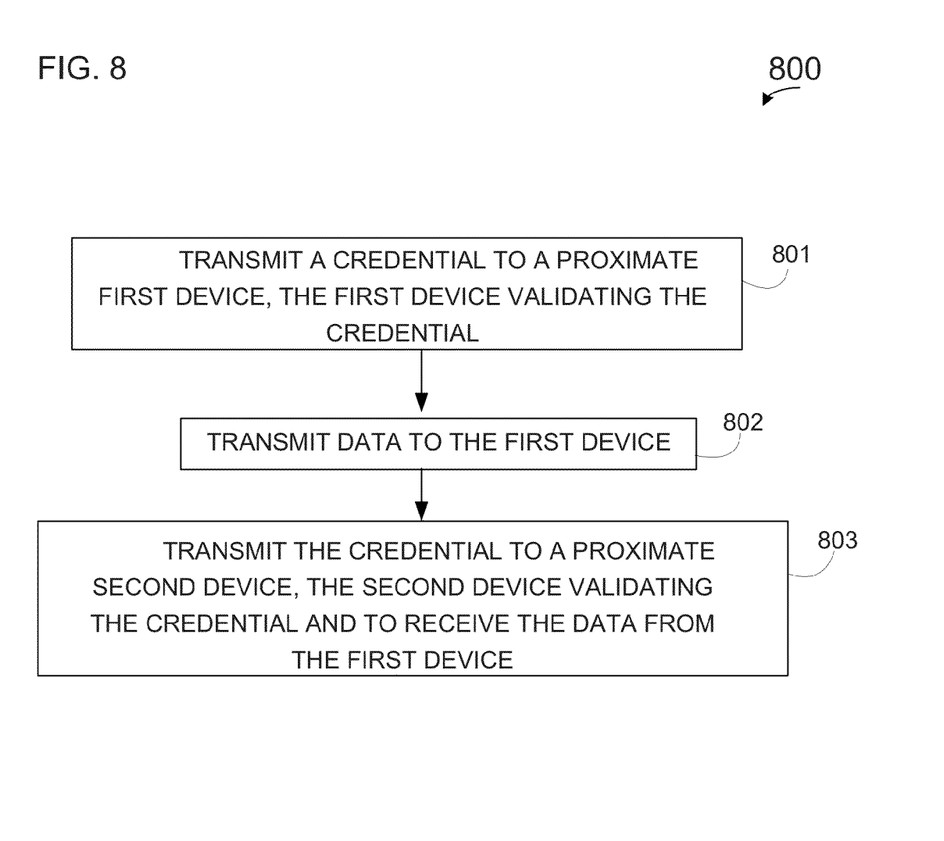
FIG. 8 is a flow chart illustrating a method, according to an example embodiment, used to transfer and receive data, to/from an additional device, where authentication takes the form of placing the device in proximity to the additional device.

FIG. 8 is a flow chart illustrating an example method 800 used to transfer and receive data, to/from an additional device, where authentication takes the form of placing the device in proximity to the additional device. Operations 801-803 may be executed as part of the command logic module 522. Operation 801 may be executed to transmit a credential to a proximate first device, the first device validating the credential. Operation 802 is executed to transmit data to the first device. Operation 803 is executed to transmit the credential to a proximate second device, the second device validating the credential and to receive the data from the first device. In some example embodiments, proximate includes orange of 0 to 4 centimeters. In some example embodiments, the credential includes at least one of a private key, a public key, a hash value, a digital representation of a finger print, or a check sum value. In some example embodiments, the first and second devices are part of the same local area network. In some example embodiments, the data is transmitted using at least one of a BLUETOOTH™ protocol, or an 802.11 protocol.

Figure 9:
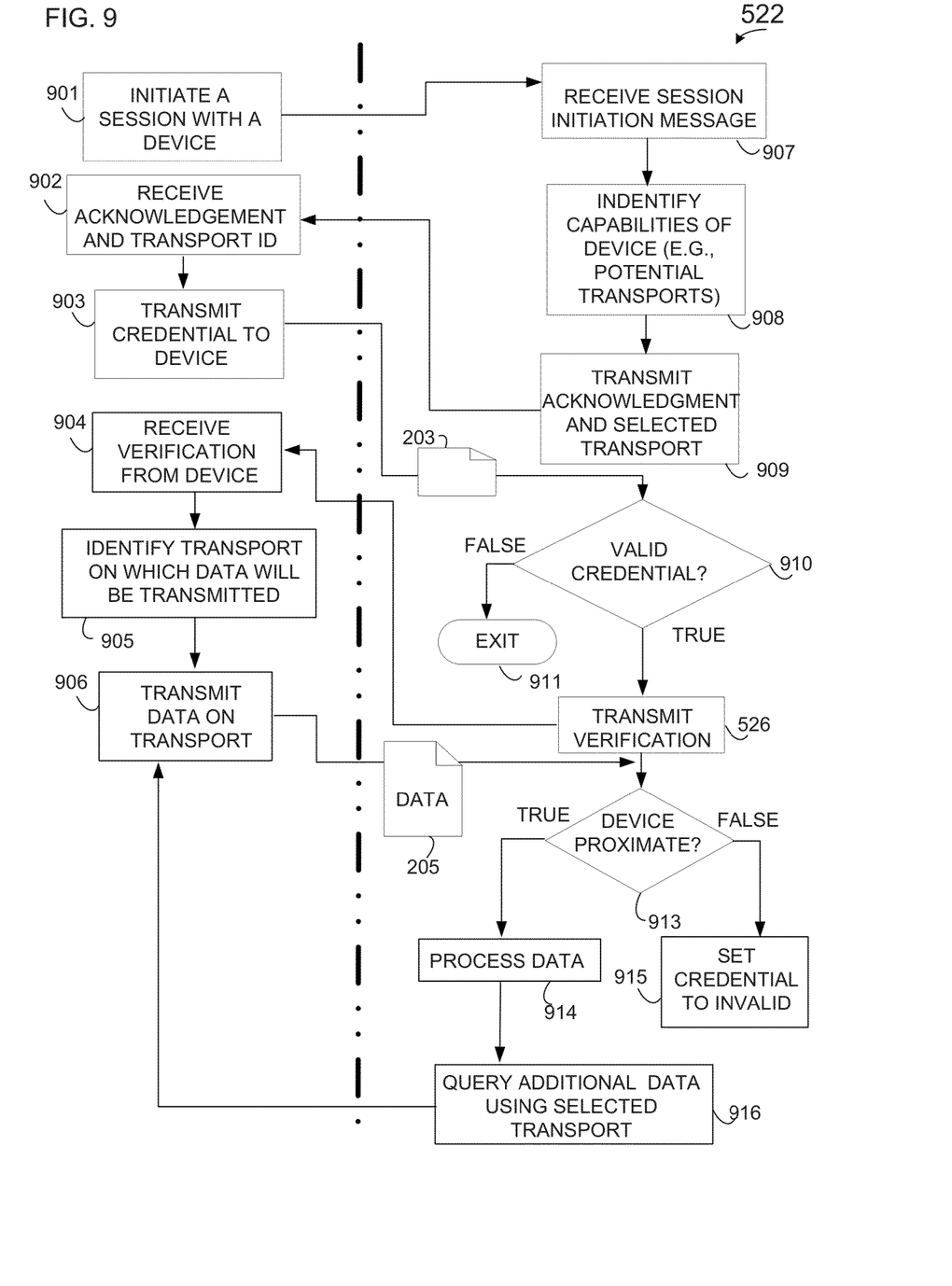
FIG. 9 is a dual-stream flowchart illustrating an execution, according to an example embodiment, of the verification logic module that facilitates the transfer and receiving of data, to/from a mobile computing device, where authentication takes the form of placing a mobile computing device in proximity to another device.

FIG. 9 is a dual-stream flowchart illustrating an example execution of the verification logic module 522 that facilitates the transfer and receiving of data, to/from a mobile computing device, where authentication takes the form of placing a mobile computing device in proximity to another device. Shown are operations 901-906 that are executed by the mobile computing 110. Also shown are operations 907-916, and the verification transmit logic module 526. These operations 907-916, and the verification transmit logic module 526 may be executed by a mobile computing device 405 or other suitable device. Operation 901 is executed to initiate a session with a device. A session may be a set up session that uses a tow-range transport medium 202. Operation 907 is executed to receive a session initiation message. Operation 908 is executed to identify capabilities of the devices participating in the session. Operation 909 is executed to transmit an acknowledgment and the selected transport common to the devices participating in the session. Operation 902 is executed to receive the acknowledgment and transport ID. The transport ID may be described using a Session Initiation Protocol (SIP), a Session Description Protocol (SDP), or other suitable protocol. Transports associated with the transport ID may include: an inductive link, MD, BLUETOOTH™, or some other suitable transport medium. Operation 903 may be executed to transmit a credential to a device. Operation 903, when executed, may retrieve a symmetric key, asymmetric key, hashed value, and/or value to be processed as a check sum, as a credential 203. Decision operation 910 is executed to determine whether the credential 203 is valid. In cases where decision operation 910 evaluates to "false" an exit condition 911 is triggered. In cases where decision operation 910 evaluates to "true" the verification transmit logic module 526 is executed, Verification transmit logic module 526 is executed and the verification of the mobile computing device transmitted. Operation 904 is executed to receive the verification form the mobile computing device. Operation 905 is executed to identify a transport on which the data 205 may be transmitted. This transport may be WiFi, GSM, CDMA, UMTS, or some other suitable transport medium. Operation 906 is executed to transmit the data 205 on the transport. Decision operation 913 is executed to determine whether a device is proximate. In cases where decision operation 913 evaluates to "false", an operation 915 is executed. In case where decision operation 913 evaluates to "true", an operation 914 is executed. Operation 915 is executed to set a credential to be invalid, where the mobile computing device is no longer proximate. Operation 914 is executed to process data. Operation 916 is executed to query additional data using the selected transport.

Figure 10:
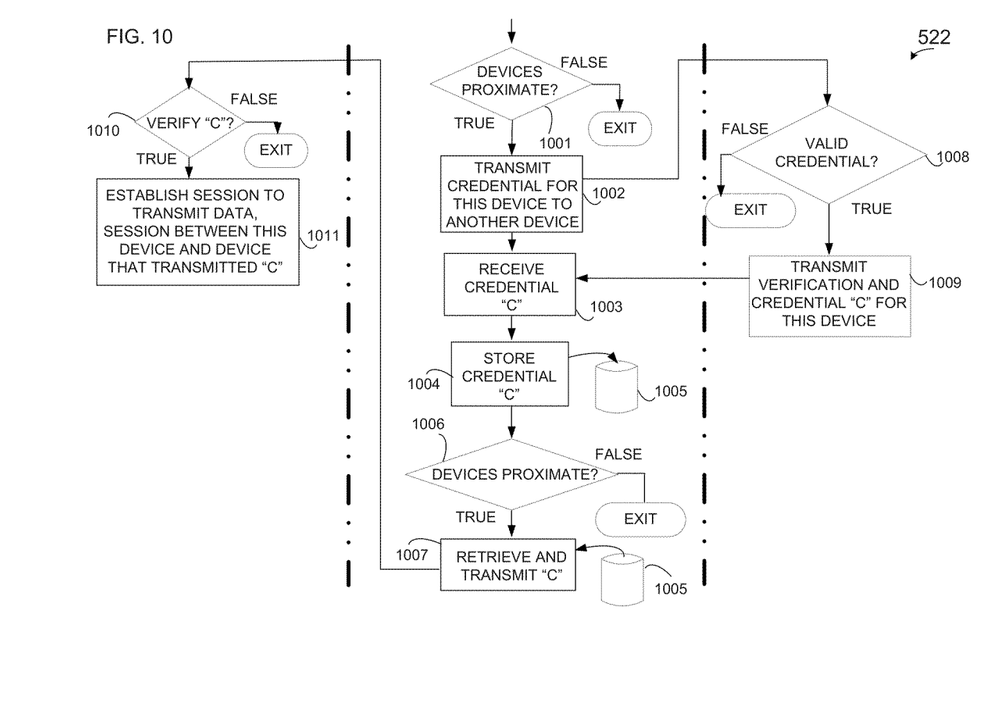
FIG. 10 is a tri-stream flowchart illustrating an execution of the verification logic module, according to an example embodiment, that facilitates the transfer and receiving of a credential amongst three devices.

FIG. 10 is a tri-stream flowchart illustrating an example execution of the verification logic module 522 that facilitates the transfer and receiving of a credential amongst three devices. Shown are operations 1001-1007 that are executed by the mobile computing 110. Also shown are operations 1008-1009 that are executed by another device. Further, shown are operations 1010-1011 that are executed by a further device. Shown is a decision operation 1001 that is executed to determine whether devices are proximate. In cases where decision operation 1001 evaluates to "false" a termination condition is executed. In cases where decision operation 1001 evaluates to "true", an operation 1002 is executed. Operation 1002 is executed to transmit the credential of this device to another device. Decision operation 1008 is executed to determine whether the received credential is valid. In cases where the decision operation 1008 evaluates to "false" a termination condition is executed. In cases where decision operation 1008 evaluates to "true" an operation 1009 is executed. Operation 1009 is executed to transmit a verification and credential "C" for this device. Operation 1003 is executed to receive credential "C". Operation 1004 is executed to store credential "C" into a database 1005. Decision operation 1006 is executed to determine whether the mobile computing device 110 and another device are proximate. In cases where decision operation 1006 evaluates to "false" a termination condition is executed. In cases where decision operation 1006 evaluates to "true" an operation 1007 is executed. Operation 1007 is executed to retrieve "C" from the database 1005 and to transmit this credential "C". Decision operation 1010 is executed to verify "C". The verification of "C" can take the form of matching two symmetric key values, processing two asymmetric key values (i.e., a public and private key), de-hashing/reverse hashing the credential "C", passing "C" through a check sum algorithm, or some other suitable method of verification. In cases where decision operation 1010 evaluates to "false" a termination condition is executed. In cases where decision operation 1010 evaluates to "true", an operation 1011 is executed. Operation 1011 is executed to establish a session to transmit data between this device and the device from which "C" originated. FIG. 4 illustrates an example execution of the verification logic module 522 of FIG. 9.

Figure 11:
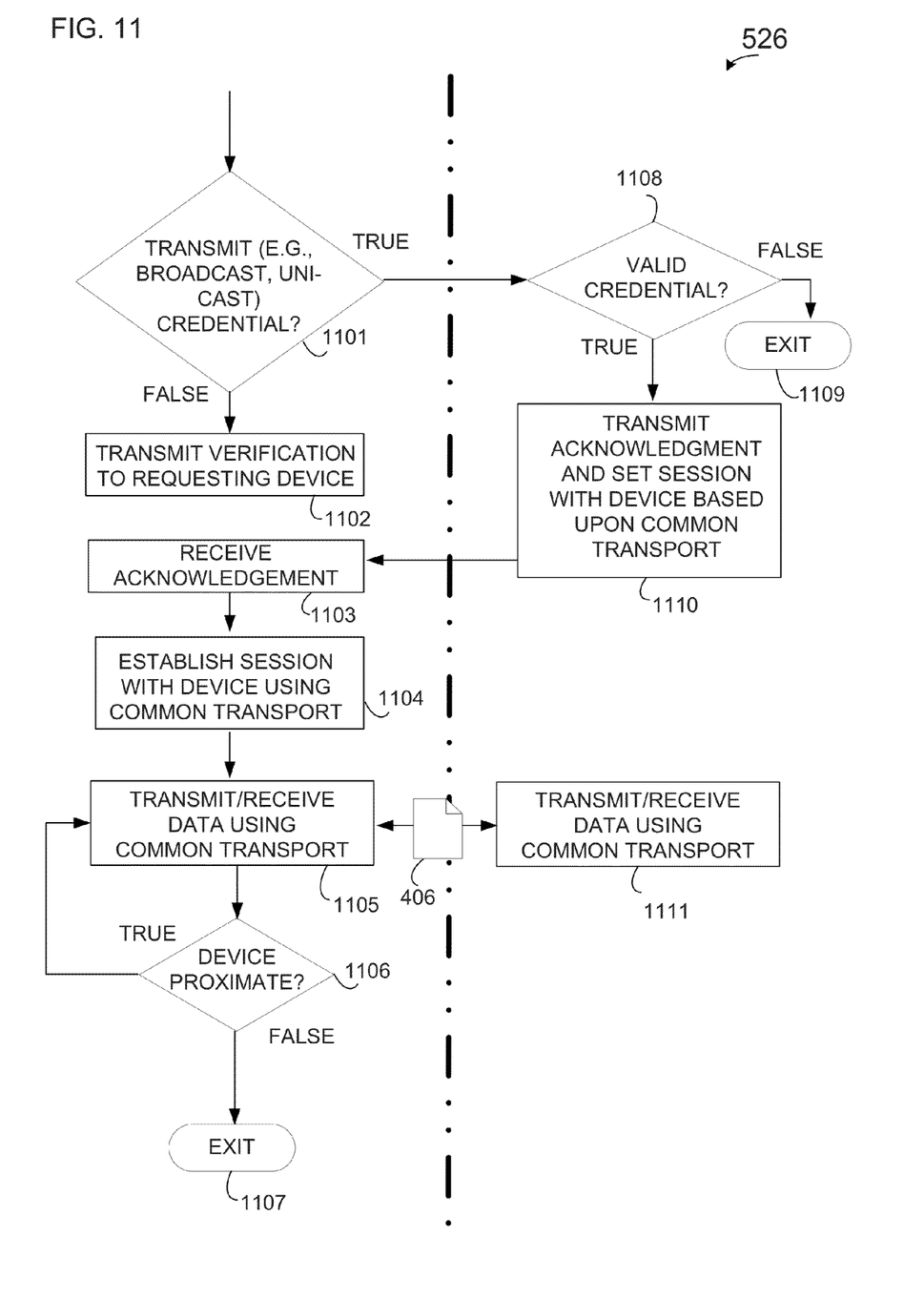
FIG. 11 is a flow chart illustrating an execution, according to an example embodiment, of a verification transmit logic module.

FIG. 11 is a flow chart illustrating an example execution of the verification transmit logic module 526. Shown are operations 1101-1107 that are executed by the wireless router 401. Further, shown are operations 1108-1111 that are executed by devices such as the printer 302, monitor 403, the laptop computer 404, and mobile computing device 405. Decision operation 1101 is executed to determine whether to transmit the credential "C". This credential is received from a mobile computing device 110. In cases where the decision operation 1101 evaluates to "true" a decision operation 1108 is executed. In cases where the decision operation 1101 evaluates to "false" an operation 1102 is executed. Decision operation 1108 is executed to determine whether the credential is valid. In cases where decision operation 1108 evaluates to "false" a termination condition 1109 is executed. In cases where decision operation 1108 evaluates to "true" an operation 1110 is executed. Operation 1102 is executed to transmit a verification request to a requesting device. Operation 1110 is executed to transmit an acknowledgment and to set a session with a device based upon a common transport. Operation 1103 is executed to receive an acknowledgement and common transport information. This transport may be WiFi, GSM, CDMA, UMTS, or some other suitable transport medium. Operation 1104 may be executed to establish a session using the device using the common transport. Operation 1105 is executed to transmit/receive data using the common transport. Operation 1111 may be used to transmit/receive data using this common transport Decision operation 1106 may be executed to determine whether a device is proximate. In cases where decision operation 1106 evaluates to "true" an operation 1105 may be executed. In cases where decision operation 1106 evaluates to "false" a termination operation 1107 may be executed.

Figure 12:
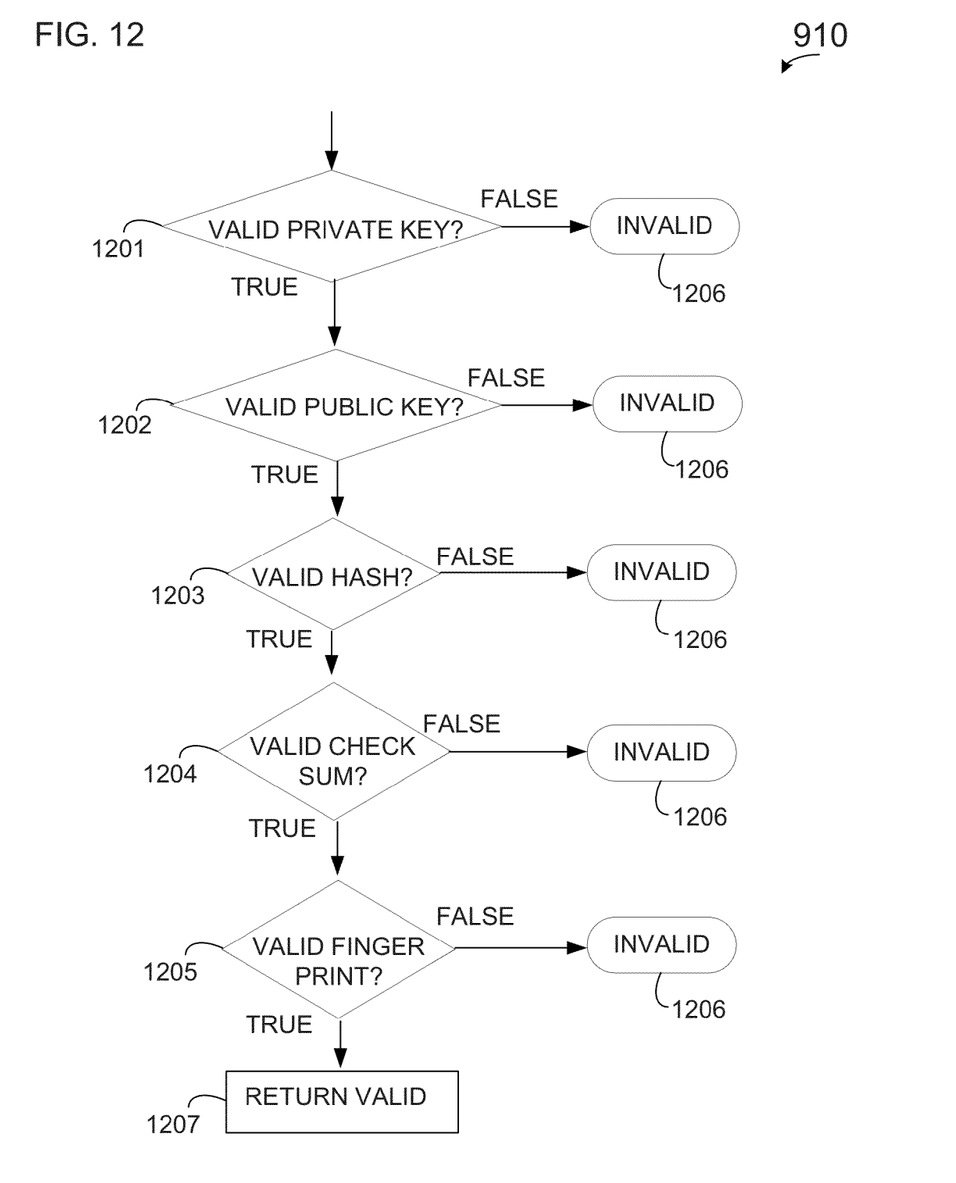
FIG. 12 is a flow chart illustrating a method, according to an example embodiment, to execute operation to validate a credential.

FIG. 12 is a flow chart illustrating an example method to execute operation 910. Shown are operations 1201-1207. These various operations may be organized as a series of case statements or conditional statements such that one or more factors of authentication (see decision operations 1201-1205) may be used. Decision operation 1201 determines whether a valid private key has been provided. Example private key authentication standards and algorithms include the Advanced Encryption Standard (AES), Blowfish, the Data Encryption Standard (DES), Triple DES, Serpent, and Twofish. In cases where decision operation 1201 evaluates to "false" a termination condition 1206 is executed. In cases where decision operation 1201 evaluates to "true" a decision operation 1202 is executed. Decision operation 1202 determines whether a valid public key has been provided. Example public key authentication standards and algorithms include Paillier, Rabin, Rivest, Shamir and Adleman (RSA), Okamoto-Uchiyama, Schnorr. In cases where decision operation 1201 evaluates to "false" a termination condition 1206 is executed. In cases where decision operation 1202 evaluates to "true" a decision operation 1203 is executed. Decision operation 1203 determines whether a valid hash value has been provided. Example hash algorithms include the Message-Digest Algorithm (MD) 5, Secure Hash Algorithm (SHA)-1, and SHA-2. In cases where decision operation 1203 evaluates to "false" a termination condition 1206 is executed. In cases where decision operation 1203 evaluates to "true" a decision operation 1204 is executed. Decision operation 1204 determines whether a valid check sum value has been provided. In cases where decision operation 1204 evaluates to "false" a termination condition 1206 is executed. In cases where decision operation 1204 evaluates to "true" a decision operation 1205 is executed. Decision operation 1205 determines whether a valid finger print has been provided. A valid finger print may be determined via an algorithm including a pattern identifying algorithm. In cases where decision operation 1205 evaluates to "false" a termination condition 1206 is executed. In cases where decision operation 1205 evaluates to "true" an operation 1207 is executed and a valid value returned denoting that the credential 301 is valid.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A method comprising:
   transmitting a first credential from a mobile device to a proximate first device, the first device validating the first credential;
   receiving, at the mobile device, a second credential from the first device; and
   transmitting the second credential from the mobile device to a proximate second device, the second device to, upon validating the second credential, establish a session to exchange data with the first device.

2. The method of claim 1, wherein proximate includes a range of 0 to 4 centimeters.

3. The method of claim 1, wherein the first credential includes at least one of a private key, a public key, a hash value, a digital representation of a finger print, or a check sum value.

4. The method of claim 1, wherein the first and second devices are part of a same local area network.

5. The method of claim 1, wherein the data is transmitted directly between the first and second devices.

6. A mobile-computing device comprising:
   at least one hardware processor;
   a memory in communication with the at least one hardware processor, the memory including logic encoded in one or more tangible media for execution and when executed operable to:
      transmit a first credential to a proximate first device, the first device validating the first credential;
      receive a second credential from the first device; and
      transmit the second credential to a proximate second device, the second device to, upon validating the second credential, establish a session to exchange data with the first device.

7. The mobile-computing device of claim 6, wherein the first credential is used to subsequently access a user profile.

8. The mobile-computing device of claim 6, wherein proximate includes a range of 0 to 4 centimeters.

9. The mobile-computing device of claim 6, wherein the second credential includes at least one of a private key, a public key, a hash value, a digital representation of a finger print, or a check sum value.

10. The mobile-computing device of claim 6, wherein the first and second devices are part of a same local area network.

11. The method of claim 1, further comprising:
    transmitting the data between the first and second devices via the mobile device.

12. The method of claim 1, wherein the first device is to transmit the second credential to the mobile device in response to validating the first credential.

13. The method of claim 1, further comprising:
    terminating the session in response to a determination that the mobile device is not proximate to at least one of the first device and the second device.

14. The mobile-computing device of claim 6, wherein the first device is to transmit the second credential to the mobile-computing device in response to validating the first credential.

15. The mobile-computing device of claim 6, the logic further operable to:
    terminate the session in response to a determination that the mobile-computing device is not proximate to at least one of the first device and the second device.

16. A computer program product comprising:
    a tangible computer-readable medium having program code recorded thereon, said program code comprising:
       program code to transmit a first credential from a mobile device to a proximate first device, the first device validating the first credential;
       program code to receive, at the mobile device, a second credential from the first device; and
       program code to transmit the second credential from the mobile device to a proximate second device, the second device to, upon validating the second credential, establish a session to exchange data with the first device.

17. The computer program product of claim 16, wherein the first credential includes at least one of a private key, a public key, a hash value, a digital representation of a finger print, or a check sum value.

18. The computer program product of claim 16, wherein the first and second devices are part of the same local area network.

19. The computer program product of claim 16, further comprising:
    program code to transmit the data between the first and second devices via the mobile device.

20. The computer program product of claim 16, further comprising:
    program code to terminate the session in response to a determination that the mobile device is not proximate to at least one of the first device and the second device.

21. An apparatus comprising:
    means for transmitting a first credential from a mobile device to a proximate first device, the first device validating the first credential;

means for receiving, at the mobile device, a second credential from the first device; and means for transmitting the second credential from the mobile device to a proximate second device, the second device to, upon validating the second credential, establish a session to exchange data with the first device.

22. The apparatus of claim 21, wherein the second credential includes at least one of a private key, a public key, a hash value, a digital representation of a finger print, or a check sum value.

23. The apparatus of claim 21, wherein the first and second devices are part of a same local area network.

24. The apparatus of claim 21, further comprising:

means for terminating the session in response to a determination that the mobile device is not proximate to at least one of the first device and the second device.

\* \* \* \* \*